United States Patent [19]
Wu et al.

[11] Patent Number: 5,514,262
[45] Date of Patent: May 7, 1996

[54] ELECTOCHEMICAL DEPOSITION OF TRANS-POLYACETYLENE FILMS

[75] Inventors: Ching-Hsong Wu, Farmington Hills, Mich.; Michael A. Tamor, Toledo, Ohio

[73] Assignee: Ford Motor Company, Dearborn, Mich.

[21] Appl. No.: 435,313

[22] Filed: May 5, 1995

[51] Int. Cl.$^6$ .................. C25B 3/00; C25D 9/02
[52] U.S. Cl. .............. 205/317; 204/414; 205/76
[58] Field of Search ............... 205/67, 76, 317; 204/59 R, 72

[56] References Cited

U.S. PATENT DOCUMENTS

| | | | |
|---|---|---|---|
| 3,457,156 | 7/1969 | Fisher | 204/168 |
| 4,258,079 | 3/1981 | Economy et al. | 427/487 |
| 4,444,970 | 4/1984 | Weddigen | 526/285 |
| 4,559,112 | 12/1985 | Tamamura et al. | 205/50 |
| 4,615,962 | 10/1986 | Garito | 430/20 |
| 4,640,748 | 2/1987 | Wudl et al. | 528/378 |
| 4,640,749 | 2/1987 | Naarmann et al. | 205/419 |
| 4,647,348 | 3/1987 | Yamakita et al. | 205/91 |
| 4,724,053 | 2/1988 | Jasne | 106/236 |
| 4,769,115 | 9/1988 | Satoh et al. | 205/352 |
| 4,781,443 | 11/1988 | Giles | 252/500 |
| 4,933,106 | 6/1990 | Sakai et al. | 252/500 |
| 5,104,948 | 4/1992 | Blumstein et al. | 526/90 |

FOREIGN PATENT DOCUMENTS

| | | |
|---|---|---|
| 653971 | 4/1965 | Belgium . |
| 58-206612 | 12/1983 | Japan . |

OTHER PUBLICATIONS

Synthesis of electrically Conducting Organic Polymers: Halogen Derivatives of Polyacetylene, $(CH)_x$ by H. Shirakawa, et al, J.C.S. Chem. Comm. 1977, pp. 578–580.

Simultaneous Polymerization and Formation of Polyacetylene Film on the Surface of Concentrated Soluble Ziegler-–Type Catalyst Solution by Ito, et al, Journal of Polymer Science, vol. 12 (1974), pp. 11–20.

Deposition of Plasma–Polymerized Acetylene by an Intense Pulsed RF Plasma Source, by Pedrow et al., IEEE, Transactions on Plasma Science, vol. 18 No. 6, Dec. 1990, pp. 945–947.

Polymer Communications, A new synthesis of Poly(acetylene), by J. H. Edwards et al, Polymer, 1980, vol. 21, Jun., pp. 595–596.

Raman Scattering in $(CH)_x$ and $(CH)_x$ Treated with Bromine and Iodine, by S. Lefrant et al, Solid State Commun. 29, 191 (1979).

*Primary Examiner*—John Niebling
*Assistant Examiner*—William T. Leader
*Attorney, Agent, or Firm*—Lorraine S. Melotik; Roger L. May

[57] ABSTRACT

The electrochemical method of this invention allows deposition of an electrically conductive trans-polyacetylene film on a substrate from a solution comprising substantially dehydrated ethyl alcohol.

8 Claims, 1 Drawing Sheet

ELECTROCHEMICAL DEPOSITION OF TRANS-POLYACETYLENE FILMS

FIELD OF THE INVENTION

This invention is directed to a method of depositing trans-polyacetylene films by electrodeposition from a solution comprising ethyl alcohol.

BACKGROUND OF THE INVENTION

Electrically conductive polyacetylene films find application in electronic, electro-optical, and photonic devices. Such films are the simplest polyconjugated organic material which exhibits the properties of electrical conductivity and are often termed "organic metals". The conductivity of polyacetylene can be increased over many orders of magnitude by doping with diverse substances.

The most widely used method for polyacetylene synthesis involves providing acetylene gas over a metal organic catalyst system to polymerize the monomer gas. Other methods involve either the polymerization of acetylene using high-energy activations such as plasma or ring opening metathetical polymerization of complex monomers and catalyst systems. These prior art methods are costly, tedious, and often involve potential explosive risks which make them commercially unattractive.

It would be desirable to synthesize polyacetylene films by a simple and low cost method. The present invention method overcomes the deficiencies of prior art methods described above and provides such a method.

DISCLOSURE OF THE INVENTION

The invention is an electrochemical method for depositing an electrically conductive trans-polyacetylene film on a substrate from a solution, which method comprises the steps of:

providing a solution comprising substantially dehydrated ethyl alcohol in a reactor, immersing a pair of electrodes in the solution, the anode of said electrode pair acting as the substrate, maintaining a substantially oxygen-free and moisture-free inert atmosphere above the solution present in the reactor, and applying a voltage between the electrodes sufficient to perform electrochemical deposition of a trans-polyacetylene films on said substrate from the solution.

DETAILED DESCRIPTION OF PREFERRED EMBODIMENTS

Figure 1:
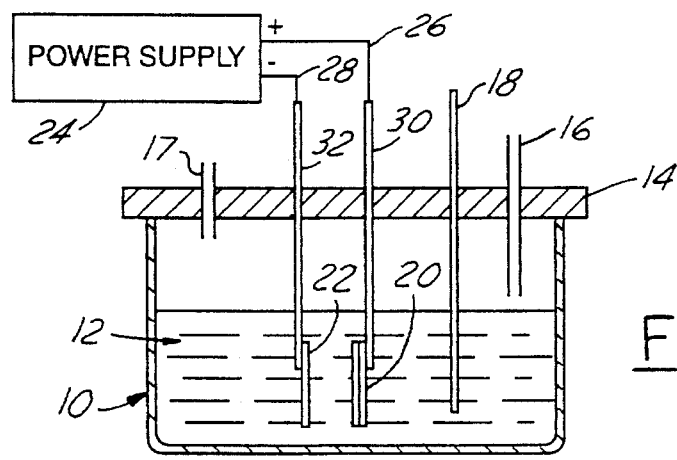
FIG. 1 is a schematic of an electrochemical system useful to deposit trans-polyacetylene films according to an embodiment of the present invention.

This invention may be described with reference to the system shown in FIG. 1. Reactor 10 contains a solution 12 of substantially dehydrated ethyl alcohol. The reactor 10 may be made of glass, Teflon, or any inert and non-conducting material. The shape and size of the reactor is not critical to the method. Desirably it may be provided with a lid 14 to prevent excessive loss of the solution due to evaporation during film deposition. It is necessary to maintain a substantially oxygen-free and substantially moisture-free inert atmosphere above the solution present in the reactor during film formation in order to provide extremely pure films. The reactor system may include inlet means 16 and vent 17 for providing such an atmosphere above the solution in the reactor. Preferably, the atmosphere provided above the solution comprises a nitrogen atmosphere, i.e., comprising or consisting of nitrogen, but other gases may be employed as the inert atmosphere including helium, argon, carbon dioxide or mixtures of any of them. If desired to monitor the temperature of the solution, a means such as a thermocouple 18 may be provided. Thermocouples useful to measure temperatures of liquids are well known to those skilled in the art. One such thermocouple is available from Omega Engineering, Inc.. During the electrodeposition, part of the electrical energy provided to the electrodes is generally converted to heat which elevates the temperature of the solution. Hence, optimally a cooling means is provided for the reactor to maintain the temperature of the solution below about 60° C. It is desirable to maintain the temperature of the solution below about 60° C., optimally between about 20° C. and 60° C., during the deposition in order to minimize solvent evaporation.

The solution comprises substantially dehydrated ethyl alcohol. By "substantially dehydrated" is meant that the alcohol contains less than 0.05% water by volume. If the solution comprises more than this amount of water, undesirably the electrolysis of the water will generate hydrogen and oxygen. A minor amount of electrolyte soluble in ethyl alcohol may be added to the solution, either before or after it is introduced into the reactor, to improve the deposition rate of the polyacetylene film on the anode during electrodeposition. Exemplary of electrolytes which may be added to the solution are sodium carbonate, oxalic acid, and mono- or poly-methyl methacrylate. Still other electrolytes which may be employed will be apparent to those skilled in the art in view of the present disclosure. When included, the electrolyte is generally added in an amount of between about 0.01 and 1.0 weight % based on the total weight of the solution. The fact that ethyl alcohol provided electrodeposited trans-polyacetylene films was unexpected since similar materials like methyl alcohol, propyl alcohol and acetone did not provide such films by this technique.

A pair of electrodes 20, 22 is immersed in the solution, the anode 20 of said electrode pair acting as the substrate on which the film will deposit during electrodeposition. In order to carry out the electrodeposition according to the present method, a voltage is applied between electrodes 20 and 22 by means of a power supply 24 sufficient to perform electrochemical deposition of a trans-polyacetylene film on the substrate cathode from the solution. The power supply can be of any type which can provide the desired regulated high voltage. The optimal voltage to be employed across the electrodes will depend on the size of the electrodes, distance between them, and the desired deposition rate. Generally, when depositing trans-polyacetylene films using electrodes of various sizes spaced >2 mm apart, the applied voltage was generally within a range of 0 to 2000 volts (V), and the current was optimally 0 to 30 milliamps (mA). More preferably, for this particular embodiment of the invention, normal operational ranges for the applied voltage and resulting current are 500 to 1500 V and 2 to 15 mA, respectively. Typical ranges of the applied voltage, the size, and the distance of electrode plates are 500 to 1500 V, 1 to 100 $cm^2$, and 5 to 15 mm, respectively. Two conducting leads 26, 28, being preferably thin copper or silver rods of 0.1–1 mm outer diameter (OD), coupled with two high voltage feed-throughs 30, 32 are generally used to bring electricity from outside to inside the reactor system shown in FIG. 1. The outer ends of leads 26, 28 are connected to power supply 24. The feed throughs 30, 32 inside the reactor are connected to the electrodes 20, 22. These electrodes may be of any size and consist of metal or non-metal conducting materials such as platinum, silicon wafer, or graphite. The invention method is seen to be particularly useful to provide trans-polyacetylene films on silicon wafer, i.e., when silicon wafer has been employed as the anodic material on which the film forms. Such trans-polyacetylene films on silicon wafer are useful as gas sensors in various applications.

The distance between the electrodes for optimal deposition is related to the applied voltage and other considerations like the concentration of any electrolytes, as would be apparent to one skilled in the art in view of the present disclosure. Desirably, the electrodes are parallel plates of similar size to ensure the homogeneity of field distribution and, therefore, the most uniform trans-polyacetylene film deposition. The electrodeposition is carried out until a film of desired thickness is deposited. As disclosed above, these films can be used in numerous applications including, but not limited to, elements of electronics, sensors, electro-optics, wave-guide and photonic devices.

It is also possible to provide doped and patterned films using the method of this invention. When films of trans-polyacetylene are doped with halogen or sulphur, their electric conductivity increases markedly, sometimes over seven orders of magnitude as in the case of iodine, (H. Shirakawa, E. J. Louis, A. G. MacDiarmid, C. K. Chiang, and A. J. Heeger, J.C.S. Chem. Comm., 1977, pp. 578). One way to achieve doping of films according to the invention is by exposure of the films to $Cl_2$, $Br_2$, $I_2$, or sulphur vapor in a vacuum chamber at room temperature for a period of up to hours. Under these conditions uptake of these gases will occur resulting in replacement of some of hydrogen atoms in the polymers by halogen or sulfur. The present invention also allows the use of another method of providing doped trans-polyacetylene films. It is accomplished by adding a minute amount (0.001 to 0.05% weight) of various kinds of halogen or sulphur containing salts such as NaCl, KBr, KI, or $Na_2S$ to the ethyl alcohol solution using the same system described herein. During the electrochemical deposition, the halogen or sulphur cations of these salts are attracted t the anode and are incorporated in the film deposition process. The resulting trans-polyacetylene films become doped with one type or more of these elements. This method is much simpler, more direct, and less costly than prior methods for providing a doped trans-polyacetylene film. The trans-polyacetylene films provided electrochemically only deposit at conducting surfaces since the free exchange of electrons is required during the deposition. Thus, the conducting surface of the substrates may be patterned prior to electrochemical deposition of the trans-polyacetylene film according to the present method. Two common methods for patterning the substrate are: (1) selected-area deposition or printing of conducting metal oxides films on insulating substrates and (2) selected-masking or deposition of insulating films on conducting substrates. Still, the patterning methods will be apparent to those skilled in the art in view of the present disclosure. The patterned films may be used, for example, for fabrication of sensors and display elements, or tabular heating units.

EXAMPLE 1

A reactor having a volume of 200 ml is filled to more than half of its volume with ethyl alcohol (200 proof, U.S.P., Punctilious (Quantum Chemical Corp., Tuscola, Ill.) and then is enclosed with an air-tight lid. Electrodes are provided which consist of two plates, one made of graphite (cathode) and the other of silicon (anode), each being approximately 2×2 cm in size. They are place approximately 10 mm apart. A nitrogen gas purging line and a small vent are provided to remove air and moisture out of the reactor. The $N_2$ flow rate is maintained in the range of 10 to 30 $cm^3$/min. As would be appreciated, this is dependant on the size of the reactor. After the total volume of nitrogen flow is about ten times that of air space above the solution level, a DC voltage of 1000 V is applied to the electrodes.

Both electrode plates are placed in parallel and are completely immersed in the solvent to ensure the most uniform electric field across the electrode surfaces. A small current is observed and monitored continuously. It begins with a value of about 5 $mA/cm^3$. The value of the initial current is dependent on the applied voltage, the size and distance of electrodes. If the solution is allowed to rise in temperature, i.e., cooling means are not employed, the current initially increases as the temperature of the solution increases, but then decreases with time.

Figure 2A:
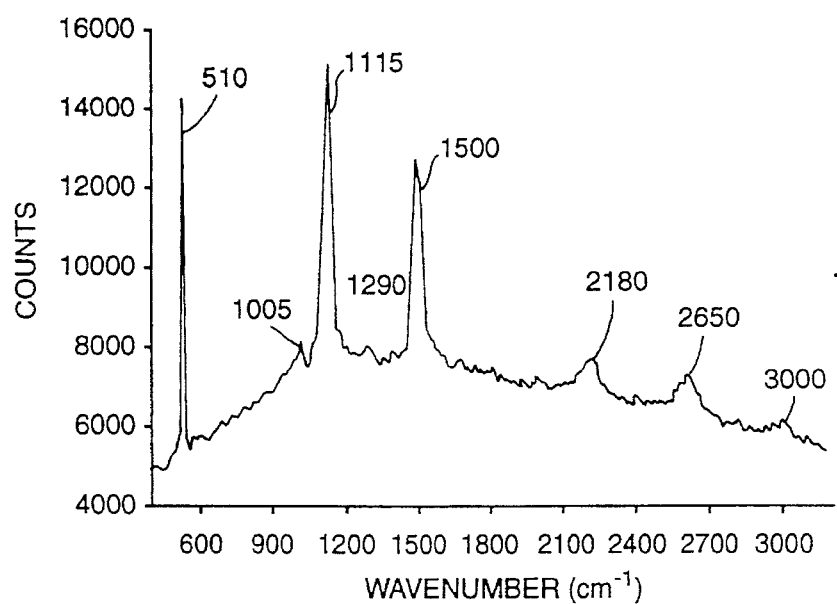
FIG. 2a is a Raman Spectrum of an embodiment trans-polyacetylene film made according to the present invention.
Figure 2B:
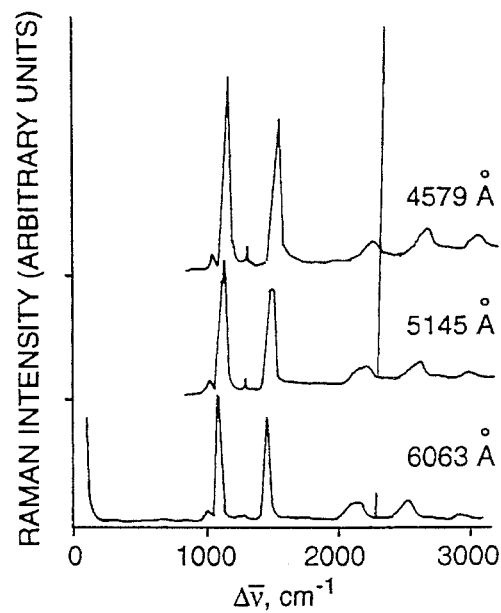
FIG. 2b is a published spectrum of a trans-polyacetylene film.

A grayish film is formed on the surface of the anode plate (silicon). The thickness of the film is about 0.05 mm after 5 hr of deposition. The film is characterized by visual observation and three surface analytical instruments, Raman spectrometer, scanning electron microscope (SEM) and X-ray photoelectron spectrometer (XPS). Raman spectrum reveals two major bands at 1115 and 1500 $cm^{-1}$ as well as five small bands at 100r, 1290, 2180, 2650, and 3000 $cm^{-1}$ as shown in FIG. 2 (*a*). This spectrum agrees excellently with a published spectroscopic signature for trans-polyacetylene (FIG. 2(*b*)), indicating the film to be isometrically pure trans-polyacetylene. The films have good electrical conductivity. SEM micrograms show uniform thickness over a large area and with slightly rough surfaces. XPS results revealed that the films are subject to oxidation when exposed to oxygen over a long period of time and hence ideally the films can be protected from oxygen, e.g., by using a nitrogen atmosphere.

EXAMPLE 2

Other embodiments of the deposition according the invention method were performed using the same apparatus, solution, and conditions in the Example 1, except that the applied voltage was varied. When the applied voltage was reduced to 300 V, the current was reduced to <1 mA. A film of thickness about 0.001 mm was obtained after 5 hours deposition. When voltage increased to 1750 V, the deposition current was increased substantially to 17 mA. The temperature of the solvent rose to over 60° C. quickly and tiny bubbles were observed near the anode. The thickness of the film obtained was ~0.02 mm in 5 hours with rough surfaces and poor uniformity. This shows that the optimal range of applied voltage for this embodiment system is between 500 and 1500 V.

EXAMPLE 3

Yet other embodiments of deposition according to the invention method were conducted under the same conditions of Example 1 but different electrolytes were added to the ethyl alcohol solution. When 0.02% of $NaCO_3$ was added to the solution and the same 1000 V was applied, the current was increased to 10 mA. The temperature of the solution increased to ~55° C. The thickness of the film obtained was 0.06 mm for 5 hours. When about 0.05% of methyl methacrylate was instead added to the solution, the current increased to 10 mA and the temperature remained at 50° C. The thickness of the film obtained was 0.08 mm for 5 hours. The films had good electrical conductivity.

We claim:

1. An electrochemical method for depositing an electrically conductive trans-polyacetylene film on a substrate from a solution, which method comprises the steps of:

providing a solution comprising substantially dehydrated ethyl alcohol in a reactor, immersing a pair of electrodes in said solution, the anode of said electrode pair acting as said substrate, maintaining an oxygen-free and moisture-free inert atmosphere above said solution in said reactor, and applying a voltage between said electrodes sufficient to perform electrochemical deposition of a trans-polyacetylene film on said substrate from said solution.

2. The electrochemical method according to claim 1, wherein the temperature of said solution during application of the voltage is maintained below about 60° C.

3. The electrochemical method according to claim 2, wherein said temperature is between about 20° C. and 60° C.

4. The electrochemical method according to claim 1 wherein said method further comprises the step of adding electrolytes to said solution.

5. The electrochemical method according to claim 4 wherein said electrolytes are added in an amount so as to comprise between about 0.001 and 1.0% weight based on the total weight of the solution.

6. The electrochemical method according to claim 5 wherein said electrolyte is selected from the group consisting of sodium carbonate, oxalic acid, and mono- or polymethyl methacrylate.

7. The electrochemical method according to claim 1 wherein said inert environment comprises a nitrogen atmosphere.

8. The electrochemical method according to claim 1 wherein said method further comprises doping said film with halogen or sulfur.

* * * * *